US012800317B2

(12) United States Patent
Benaichouche et al.

(10) Patent No.: US 12,800,317 B2
(45) Date of Patent: Nov. 17, 2026

(54) NAVIGATION ASSISTANCE DEVICE AND METHOD BASED ON MONOCULAR IMAGING

(71) Applicant: SAFRAN, Paris (FR)

(72) Inventors: Ahmed Nasreddinne Benaichouche, Moissy-Cramayel (FR); Michel Moukari, Moissy-Cramayel (FR)

(73) Assignee: SAFRAN, Paris (FR)

( * ) Notice: Subject to any disclaimer, the term of this patent is extended or adjusted under 35 U.S.C. 154(b) by 9 days.

(21) Appl. No.: 18/866,350

(22) PCT Filed: May 15, 2023

(86) PCT No.: PCT/FR2023/050691
§ 371 (c)(1),
(2) Date: Nov. 15, 2024

(87) PCT Pub. No.: WO2023/222970
PCT Pub. Date: Nov. 23, 2023

(65) Prior Publication Data

US 2025/0305830 A1 Oct. 2, 2025

(30) Foreign Application Priority Data

May 17, 2022 (FR) ....................................... 2204663

(51) Int. Cl.
*G01C 21/20* (2006.01)
*G06T 7/55* (2017.01)
(Continued)

(52) U.S. Cl.
CPC ................ *G01C 21/20* (2013.01); *G06T 7/55* (2017.01); *G06V 10/147* (2022.01); *G06V 10/40* (2022.01);
(Continued)

(58) Field of Classification Search
CPC . G01C 21/20; G06T 7/55; G06T 2207/30252; G06T 2207/20084;
(Continued)

(56) References Cited

U.S. PATENT DOCUMENTS

2020/0226419 A1 7/2020 Knaan et al.
2020/0242788 A1 7/2020 Jacobs et al.
(Continued)

OTHER PUBLICATIONS

Guo et al., Compact single-shot metalens depth sensors inspired by eyes of jumping spiders (Year: 2019).*
(Continued)

*Primary Examiner* — Aaron L Troost
(74) *Attorney, Agent, or Firm* — Sughrue Mion, PLLC

(57) ABSTRACT

A navigation assistance device intended to be installed on board a moving system includes a monocular camera capable of simultaneously acquiring a first image of a scene with a first depth of field and one or more second images of the scene with a second depth of field smaller than the first depth of field, a depth-estimator that determines a depth map of the scene from the first image of the scene and the at least one second image of the scene, and a computer vision device that calculates a navigation path from the first image of the scene and from the depth map of the scene.

12 Claims, 3 Drawing Sheets

(51) Int. Cl.
*G06V 10/147* (2022.01)
*G06V 10/40* (2022.01)
*G06V 20/56* (2022.01)

(52) U.S. Cl.
CPC .... *G06V 20/56* (2022.01); *G06T 2207/30252* (2013.01)

(58) Field of Classification Search
CPC ...... G06V 10/147; G06V 10/16; G06V 10/40; G06V 10/56; G02B 13/003; G02B 25/008; G02B 21/18; G02B 27/0075; H04N 23/958
See application file for complete search history.

(56) References Cited

U.S. PATENT DOCUMENTS

| | | | |
|---|---|---|---|
| 2022/0046219 | A1 | 2/2022 | Obla et al. |
| 2022/0057806 | A1* | 2/2022 | Guo ...................... B60W 60/00 |
| 2022/0101546 | A1 | 3/2022 | Li et al. |

OTHER PUBLICATIONS

Qi Guo et al., “Compact single-shot metalens depth sensors inspired by eyes of jumping spiders”, Proceedings of the National Academy of Sciences, Nov. 12, 2019, p. 22959-22965, vol. 116, No. 46.
Preliminary search report for FR 2204663 dated Jan. 4, 2023.
International Search Report for PCT/FR2023/050691 dated Jul. 11, 2023.

* cited by examiner

NAVIGATION ASSISTANCE DEVICE AND METHOD BASED ON MONOCULAR IMAGING

CROSS REFERENCE TO RELATED APPLICATIONS

This application is a National Stage of International Application No. PCT/FR2023/050691 filed May 15, 2023, claiming priority based on French Patent Application No. 2204663 filed May 17, 2022, the contents of each of which being herein incorporated by reference in their entireties.

TECHNICAL FIELD

The field of the invention is that of navigation assistance for a mobile system of the autonomous robot or vehicle type. The invention more particularly relates to the calculation of a navigation trajectory for the mobile system from an RGB-D image of a scene, namely the combination of a color image of the scene and of a depth map characterizing the distance of the objects seen in the image.

PRIOR ART

The calculation of a navigation trajectory can be implemented using different computer vision algorithms that take as input an image of a scene and a depth map of the same scene to provide as output a navigation solution for example with obstacle and/or collision avoidance.

The methods for estimating a depth map are generally divided into two categories: the active methods where a light source is projected into the scene and the passive methods that are based only on the acquisition of images of the scene illuminated by ambient light.

Among the passive methods, the approaches based on the multi-view geometry (for example the stereovision in the case of two views) and approaches based on monocular images are distinguished.

One of the major difficulties of the multi-view systems concerns the complexity of matching the points between images from the different views in the case of weakly textured scenes. In addition, the accuracy of this type of system strongly depends on the distance between the acquisition points of the different images (stereo base).

In the approaches based on monocular images, it is considered that a single view of the scene contains enough indices for estimating the depth map. On the one hand, these depth indices are not directly accessible in the image and on the other hand, the transformation between these measurements and the depth map is not trivial. Thus, the neural networks have been used to solve these two tasks.

It has been demonstrated that the performance of this monocular approach is improved in the case of using a blur index produced by the optics of the camera. However, the use of a camera that focuses at a given plane to acquire an image with depth defocusing blur does not allow having a sharp image at all points (image also called all-in-focus image) which can be exploited in the other vision tasks. In addition, the use of another all-in-focus camera for the other tasks poses the alignment problem. Another solution consists in using several images that focus at different planes. The disadvantage of these methods lies in the acquisition of these images that requires an alignment. Indeed, in the case of using a single variable focal length camera, the images cannot be aligned when the camera is embedded on a mobile system. The case of using several cameras poses the problem of the presence of parallax.

In addition, in this type of approach, the all-in-focus image is estimated and not acquired by the camera, which is a source of error in the case of weakly textured areas. There are other approaches that are based on the difference in blur between two (or more) images. The disadvantage of this type of approach is the absence of use of the other depth indices that can improve depth estimation performance in addition to the absence of all-in-focus images. These indices can be, like blur, of geometric nature (the perspective in the image, or the distance of the objects relative to the horizon line) and of semantic nature (the textures, the relative size of the objects, the occultations).

In summary, it is demonstrated that the focus blur of a camera constitutes an index that can significantly improve depth estimation performance. However, an image containing blur degrades the performance of the other computer vision tasks (segmentation, detection, etc.) necessary for the calculation of the navigation trajectory. The use of two cameras to acquire two images, one with a focus blur and the other sharp everywhere, does not offer a relevant solution because the alignment of two images with a parallax effect between them, one of which being blurred, constitutes a difficult task that is a source of error. The other solution, which consists in acquiring two images by the same camera by changing the focal length parameters, cannot be envisaged in the mobile systems, because the two images will not be acquired at the same time and therefore not aligned.

DISCLOSURE OF THE INVENTION

The invention aims to propose a solution based on a single camera mounted on a mobile system that can improve the depth estimation performance without degrading the vision tasks necessary for the calculation of the navigation trajectory of the mobile system. To this end, the invention proposes a navigation assistance device intended to be embedded on a mobile system, comprising a computer vision unit configured to calculate a navigation trajectory from a first image of a scene and a depth map of the scene. This device further includes a monocular camera capable to simultaneously acquire the first image of the scene with a first depth of field and at least one second image of the scene with a second depth of field smaller than the first depth of field. This device also includes a depth estimation unit configured to determine the depth map of the scene from the first image of the scene and the at least one second image of the scene.

Some preferred but non-limiting aspects of this device are as follows:

- to determine the depth map of the scene, the depth estimation unit uses a machine learning model, for example a pre-trained neural network;
- the depth estimation unit comprises two different feature extraction branches to calculate feature maps respectively of the first image and of the at least one second image and an encoder-decoder taking as input the feature maps calculated by the two feature extraction branches to determine the depth map;
- the monocular camera comprises a lens having a first focal length, a lens having a second focal length greater than the first focal length and a splitter able to direct an input light flux towards each of the lens having the first focal length and of the lens having the second focal length;

to calculate the navigation trajectory, the computer vision unit also uses the at least one second image of the scene acquired by the monocular camera;

the monocular camera is capable to simultaneously acquire the first image of the scene and a plurality of second images of the scene, the second images having a focus at different planes of the scene;

the first image is a sharp image at all points and the at least one second image has a depth defocusing blur.

The invention also relates to a navigation assistance method for a mobile system, comprising a step of calculating a navigation trajectory from a first image of a scene and a depth map of the scene. This method further includes a step of simultaneously acquiring the first image of the scene with a first depth of field and at least one second image of the scene with a second depth of field smaller than the first depth of field. This method also includes a step of determining the depth map of the scene from the first image of the scene and the at least one second image of the scene.

Some preferred but non-limiting aspects of this device are as follows:

the step of determining the depth map is executed by means of a machine learning model taking as input the first image of the scene and the at least one second image of the scene and providing as output the depth map of the scene;

the machine learning model comprises two different feature extraction branches to calculate feature maps respectively of the first image and of the at least one second image and an encoder-decoder taking as input the feature maps calculated by the two feature extraction branches to determine the depth map (Dm).

The invention extends to a computer program product comprising instructions which, when the program is executed by a computer, cause the latter to implement the steps of the above-mentioned method for determining the depth map and calculating the navigation trajectory.

The invention also relates to a method for training a machine learning model taking as input a pair of images and providing as output a depth map, comprising:

the acquisition, by the monocular camera of the aforementioned device, of a pair of training images consisting of simultaneously acquired images of a scene;

the receipt of a depth map of the scene imaged by the pair of training images;

the processing of the pair of training images by the machine learning model;

the calculation of a value representative of the performance of the machine learning model by comparison of the depth map of the scene provided as output of the machine learning model and of the depth map of the scene associated with the pair of training images.

The invention also relates to a computer program product comprising instructions which, when the program is executed by a computer, cause the latter to carry out the processing and calculation steps of the training method.

BRIEF DESCRIPTION OF THE DRAWINGS

Other aspects, aims, advantages and characteristics of the invention will appear better upon reading the following detailed description of preferred embodiments thereof, given by way of non-limiting example, and made with reference to the appended drawings in which.

DETAILED DISCLOSURE OF PARTICULAR EMBODIMENTS

Figure 1:
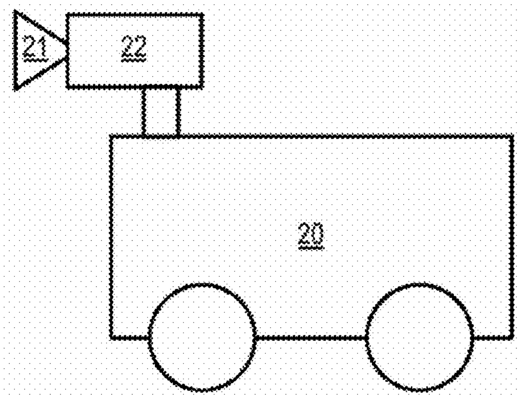
FIG. 1 is a diagram illustrating the device according to the invention mounted on a mobile system.

With reference to FIG. 1, the invention relates to a navigation assistance device intended to be embedded on a mobile system 20, for example a robot-type system or a drone dedicated to the recognition of an area, to the exploration of buildings or to the transport of materials. The navigation assistance device comprises a monocular camera 21 and a data processing module 22 configured to take as inputs the images acquired by the monocular camera.

Figure 2:
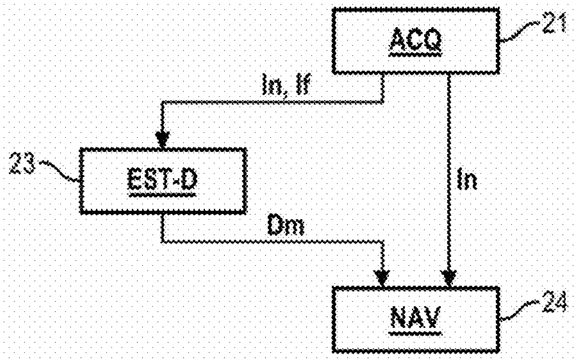
FIG. 2 is a diagram of a device according to the invention.

With reference to FIG. 2, the data processing module comprises a computer vision unit 24 configured to calculate a navigation trajectory from a first image In of a scene imaged by the monocular camera 21 and a depth map of the scene Dm. The navigation trajectory can integrate obstacle or collision avoidance.

The data processing module moreover comprises a depth estimation unit 23 configured to determine the depth map Dm of the scene.

According to the invention, the monocular camera 21 is capable to simultaneously acquire the first image of the scene In with a first depth of field and at least one second image of the scene If with a second depth of field smaller than the first depth of field. The first image of the scene and the at least one second image of the scene being simultaneously acquired by a monocular camera, they image the scene according to the same view point.

The depth estimation unit 23 is configured to determine the depth map Dm of the scene from the first image of the scene In and the at least one second image of the scene If. In one possible embodiment, the computer vision unit 24 also uses the at least one second image of the scene If to calculate the navigation trajectory.

With a second depth of field smaller than the first depth of field, the second image If forms a blurred image of the scene while the first image In forms a sharp image of the scene.

The first depth of field is preferably selected such that the first image forms an all-in-focus image that is sharp at all points. Particularly, for the acquisition of the first image, the monocular camera can be adapted to conduct a focus at the hyperfocal distance. In such a way, the first image has a sharpness range that extends from half of this hyperfocal distance to infinity. The second depth of field is such that the second image has a depth defocusing blur.

The monocular camera 21 thus makes it possible to acquire a pair of images of the scene, one of which is sharp and the other has a focus blur. Furthermore, since the two images are acquired from the same view point and at the same time, the alignment between the two images is obtained directly. The images In, If acquired by the camera are typically RGB images of the scene. The device is then functional in visible light. In one variant, the functionality of the device is extended to nighttime operation by exploiting another wavelength range (typically infrared).

The first image In is used for various vision tasks requiring a good quality image such as the localization and the mapping, the semantic segmentation or the detection and the tracking. The first image In is thus exploited by the computer vision unit 24 in order to elaborate the navigation trajectory.

The second image, which focuses at a plane and contains the blur that varies as a function of the depth, makes it possible to significantly improve the performance of the depth estimation. Moreover, according to the invention, the sharp image is also used in the depth estimation. The combination of the blur index present in the second image having the focusing blur with the depth indices present in the sharp image (which are of geometric order such as the perspective or the elevation of the objects relative to the horizon line of the image, or of semantic order such as the indices of the level of detail of the textures as a function of the distance, of relative size of the objects in the scene relative to their remoteness from the camera, or of occultations of the objects between them) makes it possible to significantly improve the performance of the depth estimation task.

Figure 3:
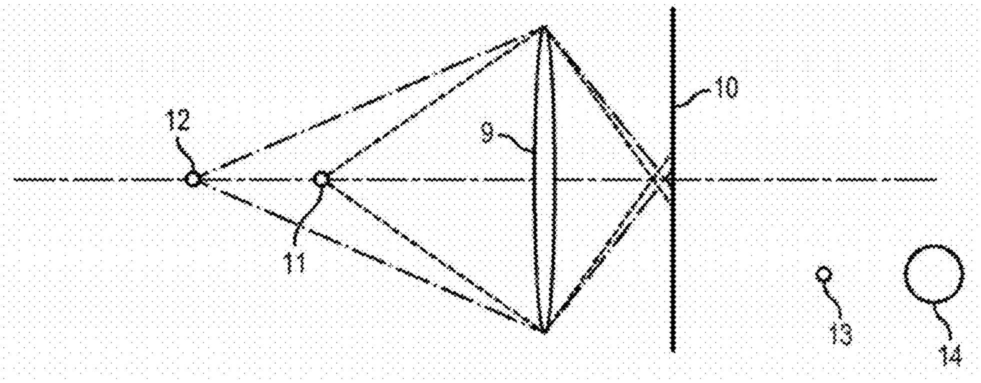
FIG. 3 is a diagram illustrating how the blur index makes it possible to perform a depth estimation.

FIG. 3 illustrates the focus blur effect. It can be seen that points 11 and 12 located at different distances from optics 9 produce optical spots of different diameters 13 and 14 on a photosensitive sensor 10. Thus, the blur diameter of a point on the sensor 10 contains an important indication on the depth of this point in the scene. However, the relationship between the blur diameter and the distance from a point is not bijective. Indeed, there are two points, one in front of the focusing plane and one behind the focusing plane, which produce two blur tasks of the same diameter. This ambiguity is implicitly removed by the depth estimation unit 23.

Figure 4:
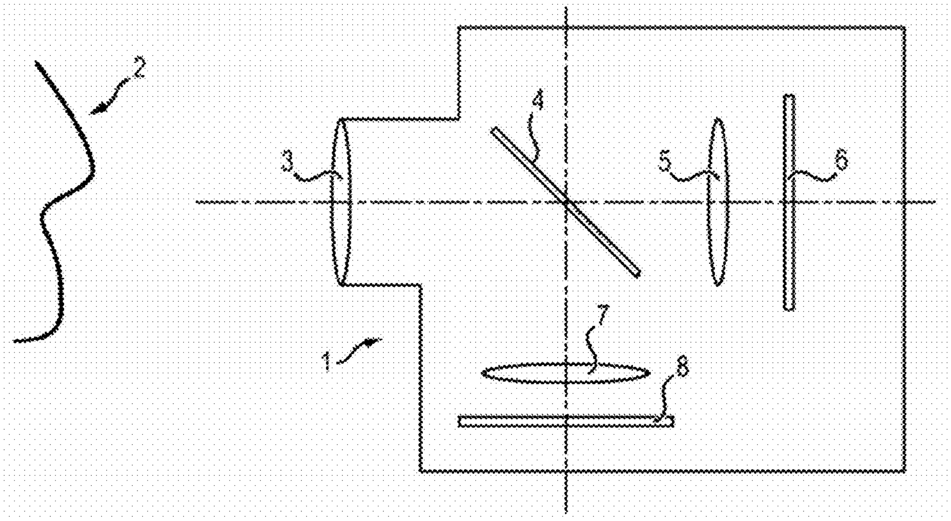
FIG. 4 is a diagram of a first exemplary embodiment of the monocular camera of the device according to the invention.

FIG. 4 is a diagram illustrating one possible embodiment of the monocular camera of the navigation assistance device according to the invention. The camera 1 comprises an acquisition system which includes an input optics 3 for imaging the surface of an object 2 of the scene inside the acquisition system, a splitter 4 (for example a semi-reflecting mirror) which makes it possible to direct an input light flux towards two lenses 5 and 7, one of which having a shorter focal length than the other. The light flux is then integrated by the two photosensitive sensors 6 and 8, thus making it possible to provide the sharp image In and the blurred image If. The advantage of this acquisition system is that it makes it possible to produce two images of the same scene captured at the same time and without parallax effect between them.

Figure 5:
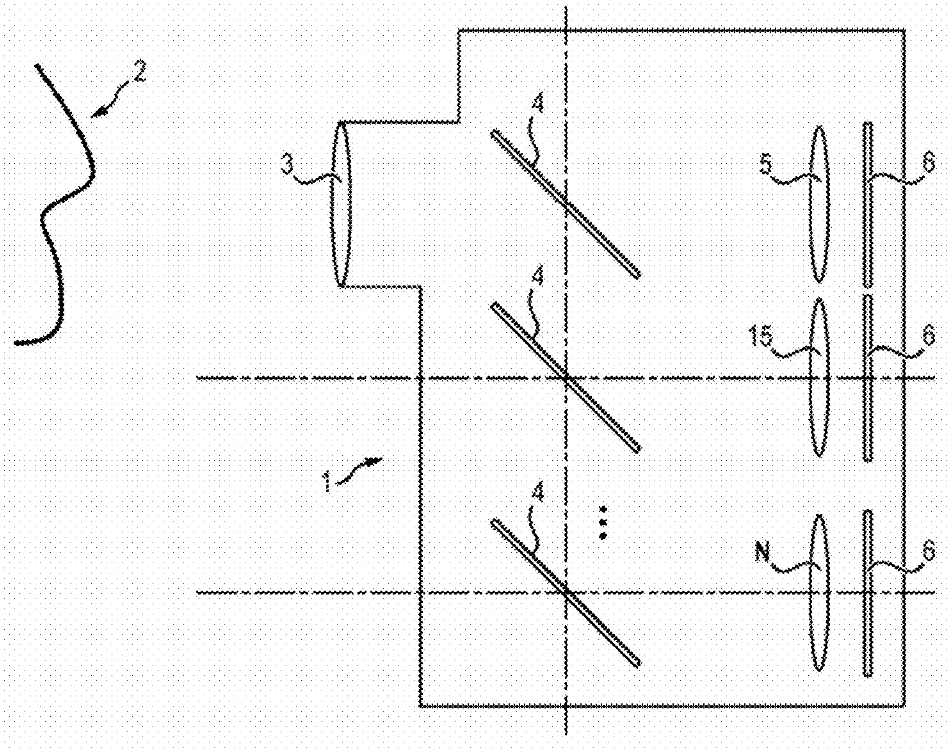
FIG. 5 is a diagram of a second exemplary embodiment of the monocular camera of the device according to the invention.

FIG. 5 is a diagram illustrating another possible embodiment of the monocular camera 1 of the navigation assistance device according to the invention. In this embodiment, the acquisition system is configured to allow the simultaneous acquisition of N images of the scene including a sharp image and N−1 blurred images that have a focus at different planes of the scene. This embodiment proves advantageous in that it makes it possible to obtain more blur gradient measurements and consequently to further improve the accuracy of the results obtained for the estimation of the depth map. In addition, this configuration makes it possible to directly remove the depth ambiguity as a function of the radius of the blur task. With blurred images of various focuses and a sharp image, the depth estimation unit is indeed able to estimate the order relationship between the different sharp planes of an image and the blurred plane of this same image.

In one possible embodiment, the depth estimation unit 24 uses a machine learning model, for example a pre-trained neural network such as a convolutional neural network (CNN).

This machine learning model takes as input the first image of the scene and the at least one second image of the scene and provides as output the depth map of the scene. The architecture of the machine learning model is preferably adapted to perform a pixel-by-pixel regression task, in this case the calculation, for each pixel, of the distance of the object which is represented at this pixel to the camera.

Figure 6:
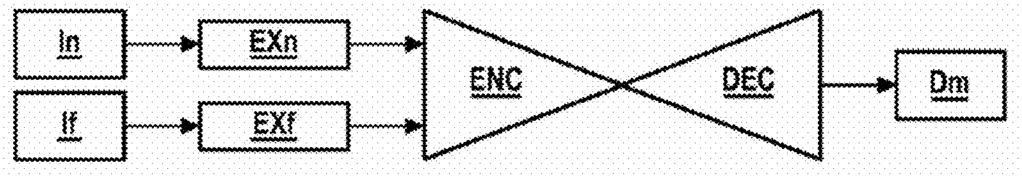
FIG. 6 is a diagram of one possible embodiment of the depth estimation unit.

With reference to FIG. 6, the machine learning model can comprise two different feature extraction branches EXn, EXf to calculate feature maps respectively of the sharp image In and of the blurred image(s) If. These image feature extraction branches comprise successive convolution layers followed by nonlinearities such as data normalization functions, dimension reduction functions or nonlinear reprojection functions such as, among others, the sigmoid or the rectified linear unit. The features extracted from the sharp image and from the blurred image(s) by each of the branches EXn and EXf are then delivered to an encoder-decoder which comprises an encoder ENC, typically a convolutional neural network, responsible for reducing the dimension of the data and a decoder DEC which takes as input the reduced dimension features produced by the encoder in order to predict the depth map of the scene Dm. This decoder is also typically a convolutional neural network whose purpose is to recover the spatial dimension at the input of the auto-encoder while calculating the features necessary for decoding the features.

The invention is not limited to the device as described above, but also extends to a navigation assistance method for a mobile system. With reference to FIG. 2, this method comprises:

- a step of simultaneously acquiring ACQ a first image of a scene In with a first depth of field and at least one second image of the scene If with a second depth of field smaller than the first depth of field,
- a step of determining EST-D a depth map of the scene Dm from the first image of the scene In and the at least one second image of the scene If, and
- a step of calculating NAV a navigation trajectory from the first image of a scene In and the depth map of the scene Dm.

The invention also extends to a computer program product comprising instructions which, when the program is executed by a computer, lead the latter to implement the above steps of determining the depth map and calculating the navigation trajectory.

The invention moreover relates to a method for training a machine learning model taking as input a pair of images and providing as output a depth map. This method follows an iterative process which comprises:

- the acquisition, by the monocular camera of the device according to the invention, of a pair of training images consisting of simultaneously acquired images of a scene;
- the receipt of a depth map of the scene imaged by the pair of training images, said map having been obtained by a third-party method, for example a depth map acquired by a Lidar, by means of structured light, by a time-of-flight camera, by stereovision, etc.;
- the processing of the pair of training images by the machine learning model;
- the calculation of a value representative of the performance of the machine learning model by comparison of the depth map of the scene provided at the output of the machine learning model and of the depth map of the scene associated with the pair of training images.

The parameters of the learning model, for example the connection weights in the case of a neural network, are then adjusted to reduce the depth map prediction error. For example, the gradient of the error can be calculated to determine a direction of variation and a displacement in a direction opposite to the gradient is then carried out.

This training can be performed using a database of image pairs, each associated with a depth map, divided into pairs of training images and pairs of test images. As previously indicated, the training of a neural network consists in determining the value of each of its weights. The neural network processes a pair of training images and makes a prediction at the output. As the pixel-to-pixel depth of each of the training images is known, it is possible to check whether this prediction is correct. Depending on the veracity of this prediction, the weights of the network are updated for example according to the error gradient backpropagation algorithm. This process is repeated with all the pairs of training images. Once the training is complete, it is possible to evaluate the model thus trained by presenting it with the pairs of test images and by comparing the outputs of the model with the depth maps associated with the pairs of test images.

The invention also extends to a computer program product comprising instructions which, when the program is executed by a computer, lead the latter to implement the processing and calculation steps of the method for training the machine learning model.

The invention offers the following advantages:

- low cost compared to an active system for determining a depth map, such as a system exploiting a Lidar, the Low cost compared to the Lidar-based system;
- better estimation performance by using a key monocular depth index, namely blur,
- use of all the depth indices combined, thanks to the sharp image;
- elimination of the image alignment step thanks to the acquisition system (images acquired at the same time and without parallax effect);
- acquisition, and not estimation, of an all-in-focus image exploitable in the other vision tasks.

The invention claimed is:

1. A navigation assistance device intended to be embedded in a mobile system, the navigation assistance device comprising:

a monocular camera comprising a first lens having a first focal length, a second lens having a second focal length greater than the first focal length and a splitter that directs an input light flux towards each of the first lens and the second lens, the monocular camera being configured to simultaneously acquire a first image of a scene with a first depth of field and at least one second image of the scene with a second depth of field smaller than the first depth of field; and a computer configured to:

determine a depth map of the scene from the first image of the scene and the at least one second image of the scene; and calculate a navigation trajectory from the first image of the scene and the depth map of the scene.

2. The navigation assistance device according to claim 1, wherein to determine the depth map of the scene, the computer uses a machine learning model.

3. The navigation assistance device according to claim 2, wherein the machine learning model comprises two feature extraction branches to calculate feature maps respectively of the first image and of the at least one second image and an encoder-decoder which takes as input the feature maps calculated by each of the two feature extraction branches to determine the depth map.

4. The navigation assistance device according to claim 1, wherein to calculate the navigation trajectory, the computer also exploits the at least one second image of the scene acquired by the monocular camera.

5. The navigation assistance device according to claim 1, wherein the monocular camera is configured to simultaneously acquire the first image of the scene and a plurality of second images of the scene, the second images having a focus at different planes of the scene.

6. The navigation assistance device according to claim 1, wherein the first image is a sharp image at all points and the at least one second image has a depth defocusing blur.

7. A navigation assistance method for a mobile system, the navigation assistance method comprising:

simultaneously acquiring, with a monocular camera comprising a first lens having a first focal length, a second lens having a second focal length greater than the first focal length and a splitter that directs an input light flux towards each of the first lens and the second lens, a first image of a scene with a first depth of field and at least one second image of the scene with a second depth of field smaller than the first depth of field, determining, by a computer, a depth map of the scene from the first image of the scene and the at least one second image of the scene, and calculating, by the computer, a navigation trajectory from the first image of the scene and the depth map of the scene.

8. The navigation assistance method according to claim 7, wherein the depth map is determined using a machine learning model taking as input the first image of the scene and the at least one second image of the scene and providing as output the depth map of the scene.

9. The navigation assistance method according to claim 8, wherein the machine learning model comprises two feature extraction branches to calculate feature maps respectively of the first image and of the at least one second image and an encoder-decoder taking as input the feature maps calculated by each of the two feature extraction branches to determine the depth map.

10. A non-transitory computer-readable medium storing instructions which, when executed by a computer, cause the computer to at least:

determine a depth map of a scene from a first image of a scene and at least one second image of the scene, the first image being a sharp image at all points and the at least one second image having a depth defocusing blur, and calculating a navigation trajectory from the first image of the scene and the depth map of the scene.

11. A navigation assistance device intended to be embedded in a mobile system, the navigation assistance device comprising:

a monocular camera configured to simultaneously acquire a first image of a scene with a first depth of field and at least one second image of the scene with a second depth of field smaller than the first depth of field, the first image being a sharp image at all points and the at least one second image having a depth defocusing blur; and a computer configured:

to determine a depth map of the scene from the first image of the scene and the at least one second image of the scene; and to calculate a navigation trajectory from the first image of the scene and the depth map of the scene.

12. A navigation assistance method for a mobile system, the navigation assistance method comprising simultaneously acquiring a first image of a scene with a first depth of field and at least one second image of the scene with a second depth of field smaller than the first depth of field, wherein the first image is a sharp image at all points and the at least one second image has a depth defocusing blur, determining a depth map of the scene from the first image of the scene and the at least one second image of the scene, and calculating a navigation trajectory from the first image of the scene and the depth map of the scene.

* * * * *